Sept. 15, 1925.
C. W. BECK
STEERING WHEEL
Filed Sept. 15, 1924
1,553,498
2 Sheets-Sheet 2
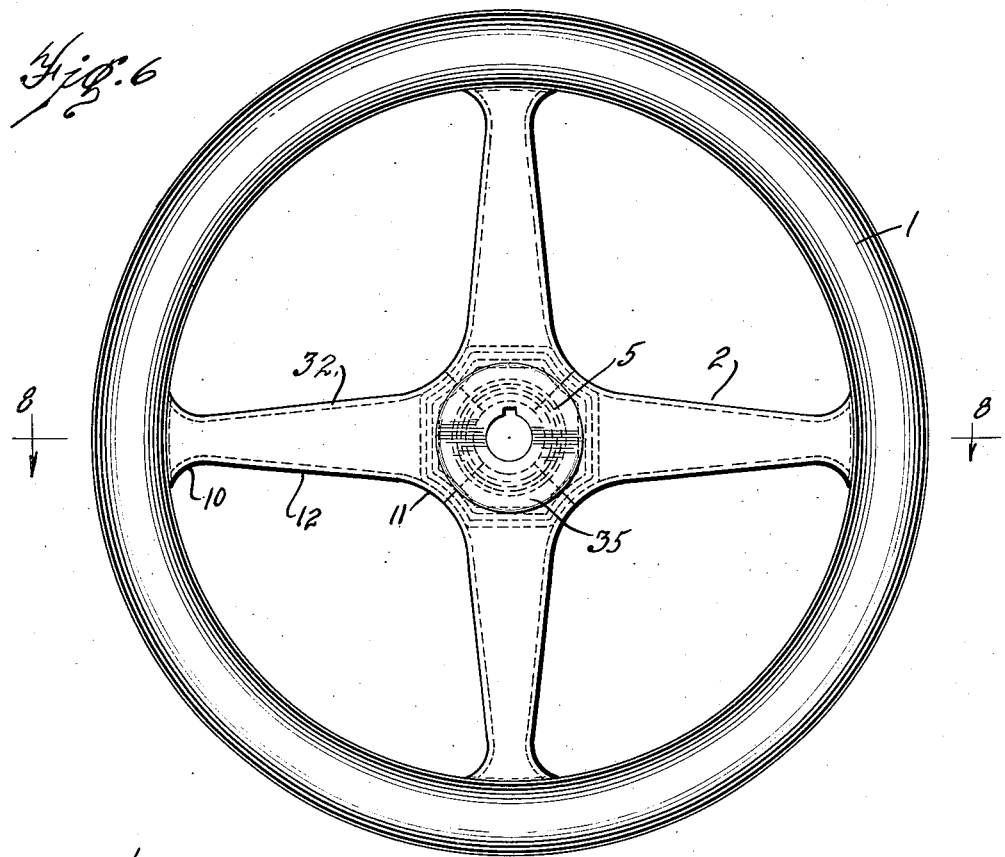
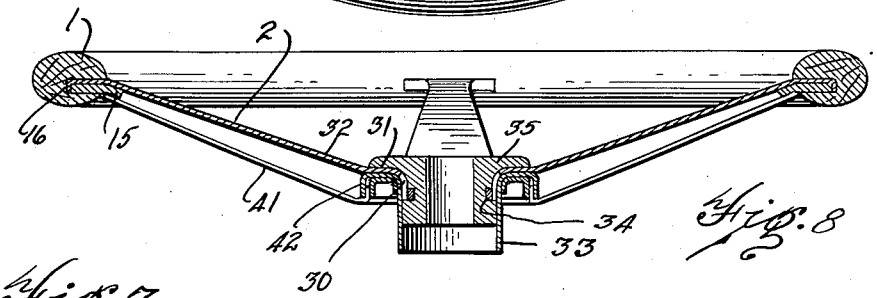
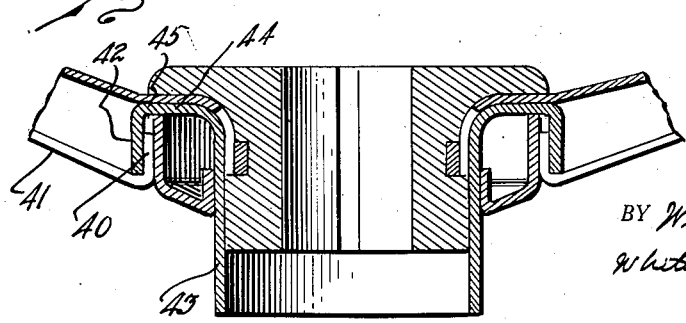
INVENTOR.
Charles W. Beck
BY
ATTORNEYS Patented Sept. 15, 1925.

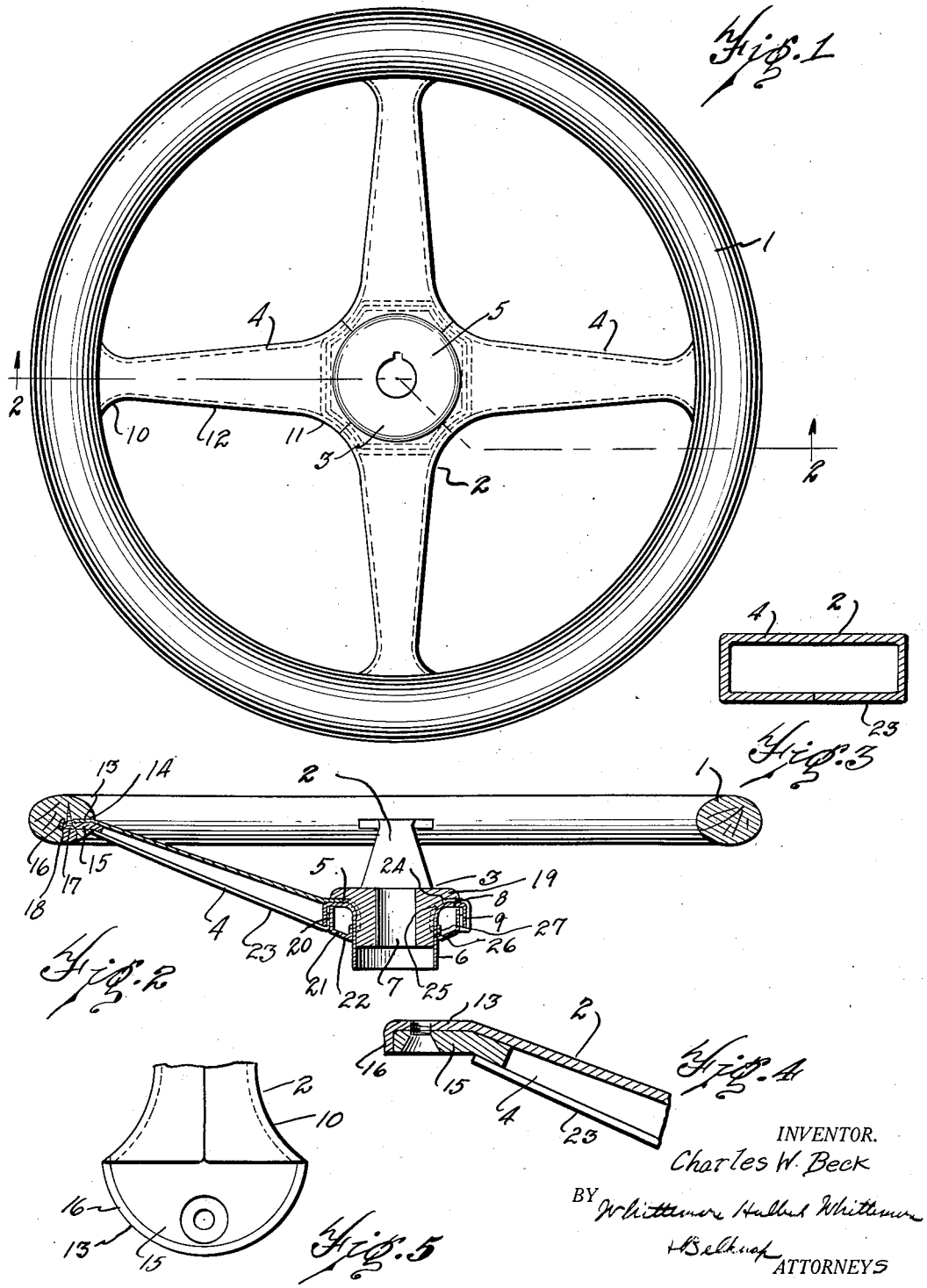

1,553,498

UNITED STATES PATENT OFFICE.

CHARLES W. BECK, OF DETROIT, MICHIGAN, ASSIGNOR TO THE BECK-FROST CORPORATION, OF DETROIT, MICHIGAN, A CORPORATION OF MICHIGAN.

STEERING WHEEL.

Application filed September 15, 1924. Serial No. 737,867.

*To all whom it may concern:*

Be it known that I, CHARLES W. BECK, a citizen of the United States of America, residing at Detroit, in the State of Michigan and county of Wayne, have invented certain new and useful Improvements in Steering Wheels, of which the following is a specification, reference being had therein to the accompanying drawings.

This invention relates to steering wheels for motor vehicles, boats and the like but refers more particularly to wheels wherein the spider or metal part is preferably of the built up and assembled type.

One of the essential objects of the invention is to provide a wheel of this type having spider arms that are preferably tubular in form.

Another object is to provide simple and effective means for connecting the tubular spider arms to the hub of the spider.

A further object is to provide the spider arms with a securing element which also conceals the inner ends of the arms as well as the flanges of the shell of the hub.

Still another object is to provide a strong and durable wheel which is simple in construction and which can be manufactured at a comparatively low cost.

With the above and other objects in view the invention consists of certain novel features of construction, combinations and arrangements of parts as will be more fully described and particularly pointed out in the appended claims.

In the accompanying drawings;

Figure 1 is a top plan view of a steering wheel embodying my invention.

Figure 2 is a sectional view taken on the line 2—2 of Figure 1.

Figure 3 is a sectional view taken on the line 3—3 of Figure 1.

Figure 4 is a fragmentary sectional view through the outer end portion of one of the spider arms.

Figure 5 is a top plan view of the construction shown in Figure 4.

Figure 6 is a top plan view of a slightly modified form of wheel.

Figure 7 is a sectional view taken on the line 7—7 of Figure 6.

Figure 8 is a fragmentary sectional view through another modified form of wheel.

Referring now to the drawings in which like characters of reference designate corresponding parts throughout the several views, the numeral 1 designates a rim, preferably of wood, detachably secured to a metallic spider 2 which includes a hub 3 and a plurality of radially extending arms 4.

As shown the hub 3 preferably comprises a core 5 and an outer shell 6. The core is preferably cast into the shell and is provided with a longitudinally extending tapering bore 7 for receiving the usual steering stem (not shown) while the shell 6 is preferably formed of sheet metal and is provided at its upper open end with a laterally extending flange 8 that is preferably of octagonal form and is provided with a depending marginal flange 9.

The arms 4 of the spider are preferably tubular in form and are preferably constructed of aluminum. As shown, the opposite end portions 10 and 11 of the arms are flared for engagement with the hub 3 and rim 1 respectively, while the intermediate portions 12 of the arms preferably taper gradually from the flared portions 11 to the flared portions 10. As shown in Figures 1 and 2, the flared portions 10 preferably terminate at the inner periphery of the rim 1 and are provided with relatively short marginally flanged extensions 13 that are preferably semi-circular in form and engage correspondingly shaped recesses or pockets 14 in the rim 1. Suitable metallic reinforcing fillets 15 engage the extensions 13 inside the marginal flanges 16 and extend a short distance within the tapered portions 12 of the spider arms, while suitable screws 17 are preferably driven through the fillets 15 and the extensions 13 for securing the arms 4 to the rim. Wooden segments 18 are preferably placed in the recesses 14 to conceal the screws 17 and fillets 15 after the arms have been attached to the rim.

For rigidly securing the spider arms 4 to the hub 3, the tops 18 of the flared portions 11 are preferably bent over the flange 8 and against the inner face of the shell 6, and are held in position by the core 5, which is preferably provided at its upper end with an over-hanging flange 19. The bottoms 20 of the flared portions 11 are preferably bent upwardly against the inner face of the depending marginal flange 9 and are retained in position by means of a channel shaped ring 21. This ring is preferably formed of steel and is forced upwardly upon the shell 6 until the lower inclined base 22 of the channel is substantially flush with the bottoms 23 of the spider arms. Thus this ring conceals the flanges 8 and 9 of the shell and the bent end portions 20 of the arms, in addition to serving as a securing element for the arms.

In the process of construction, the separate spider arms 4 are assembled upon the flange 8 of the shell 6 and are retained in position by the channel shaped ring 21. The core 5 is then cast into the shell and over the inner ends of the top flared portions 18 of the arms. To insure a positive connection between the core and arms, the flared portions 18 of the latter are preferably provided with openings 24 through which the molten metal will flow during the die casting operations to form the projections 25. To insure a rigid connection between the core 5 and shell 6, the latter is preferably provided at spaced points with suitable openings 26 through which the molten metal of the core will flow during the die casting operations to form the projections 27. The projections 25 form anchors for the spider arms while the projections 27 prevent relative movement of the core and shell, consequently the parts of the hub will be permanently and rigidly secured together.

In Figures 6 and 7 I have shown a slight modification in which the inner ends 30 of the top flared portions 31 of the spider arms 32 are held firmly against the inner walls of the shell 33 by means of a steel ring 34 which is preferably forced downwardly into position when the arms 32 are assembled upon the shell. Thus, with this construction, the die cast core 35 cooperates with the ring 34 for holding the arms 32 of the spider.

In Figure 8 I have shown still another modification in which the upwardly bent end portions 40 of the spider arms 41 are held against the depending marginal flange 42 of the shell 43 by means of an inverted channel shaped ring 44 which is preferably forced upwardly into position and is subsequently welded to the lateral flange 45 of the shell 43.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a wheel, the combination with a rim, of a hub having a shell and a core in the shell, spider arms secured to the rim and core, and a ring securing other portions of said arms to the shell.

2. In a wheel, the combination with a plurality of spider arms, of a hub having a shell provided with a lateral flange, said flange having a depending flange and means for clamping portions of said arms against said depending flange.

3. In a wheel, the combination with a plurality of spider arms, of a hub having a shell provided with a lateral flange, said flange having a depending flange, means for holding portions of said arms against said lateral flange, and means engaging said shell for clamping other portions of said arms against said depending flange.

4. In a wheel, the combination with a plurality of spider arms, of a hub having a shell provided with a lateral flange, said flange having a depending flange, and a ring sleeved on said shell clamping portions of said arms against said depending flange.

5. In a wheel, the combination with a rim, of a hub having a shell provided with a lateral flange, said flange having a depending flange, hollow spider arms secured to said rim having portions extending over the lateral flange of said shell and having portions bent upwardly against said depending flange, means carried by said shell for securing the upwardly bent portions of said arms to the depending flange, and means also carried by said shell for securing the first mentioned portions of said arms against said lateral flange.

6. In a wheel, the combination with a rim, of a hub having a shell provided with a lateral flange, and a core in the shell, said flange having a depending flange, hollow spider arms secured to said rim having portions extending over the lateral flange of said shell and embedded in said core and having other portions bent upwardly against said depending flange, and means sleeved upon said shell for securing the upwardly bent portions of said arms to the depending flange aforesaid.

7. In a wheel, the combination with a rim, of a hub having a shell provided with a lateral flange and a core in the shell, said flange having a depending flange, hollow spider arms secured to said rim having portions extending over the lateral flange of said shell and embedded in the core, and having other portions bent upwardly against the depending flange, and a member surrounding said shell and clamping the upwardly bent portions of said arms against the depending flange aforesaid.

8. In a wheel, the combination with a plurality of spider arms, of a hub having a shell provided with a lateral flange, said flange having a depending flange, a core in the shell having a flange holding portions of said arms against said lateral flange, and means engaging said shell for clamping other portions of said arms against said depending flange.

9. In a wheel, the combination with a plurality of spider arms, of a hub having a shell provided with a depending flange, and a ring sleeved on said shell clamping portions of said arms against said depending flange.

10. In a wheel, the combination with a rim, of a hub having a shell provided with a lateral flange and a depending flange, spider arms secured to said rim having portions extending over the lateral flange of said shell and having portions bent upwardly against said depending flange, means carried by said shell for securing the upwardly bent portions of said arm to the depending flange, and means also carried by said shell for securing the first mentioned portions of said arms against said lateral flange.

11. In a steering wheel, the combination with a rim having spaced recesses, of a spider having hollow arms engaging the recesses, fillets in the arms, and means for securing the arms to the rim including headed elements extending through the fillets and arms.

12. In a wheel, the combination with a spider having a plurality of arms, of a hub having a shell provided with a lateral flange supporting portions of the arms, a depending flange, and means surrounding the shell securing other portions of said arms to said depending flange.

13. In a wheel, the combination with a spider having a plurality of arms, of a hub having a shell provided with a lateral flange supporting portions of the arms, a depending flange, and a ring sleeved upon the shell securing other portions of the arms to the depending flange.

14. In a wheel, the combination with a spider having a plurality of arms, of a hub having a shell, a flange surrounding the shell in spaced relation thereto, and a ring sleeved on the shell clamping portions of said arms against said flange.

15. In a wheel, the combination with a spider having a plurality of arms, of a hub having a shell, a flange surrounding the shell in spaced relation thereto, and means between the flange and shell securing the arms to the flange.

In testimony whereof I affix my signature.

CHARLES W. BECK.